Jan. 4, 1944.    A. E. ROSENBERG    2,338,303
KNIFE RACK
Filed June 22, 1943    2 Sheets-Sheet 1
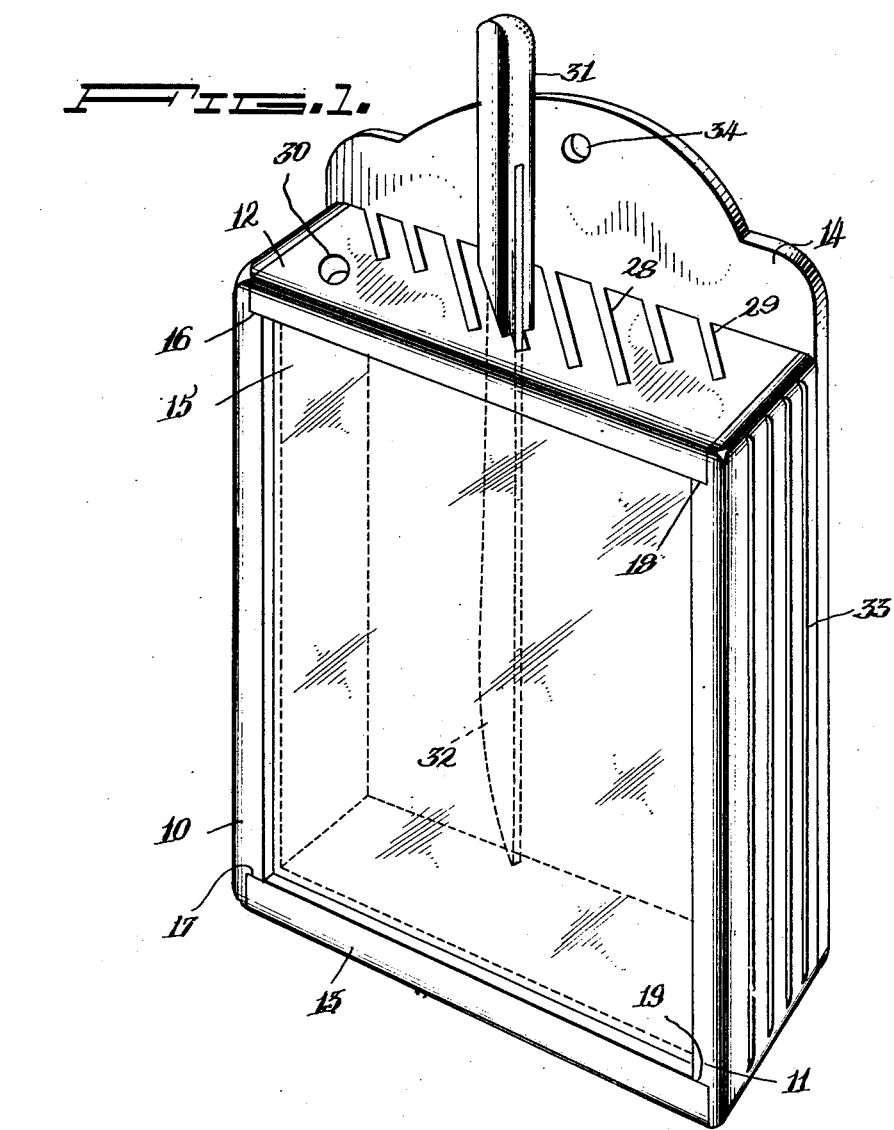
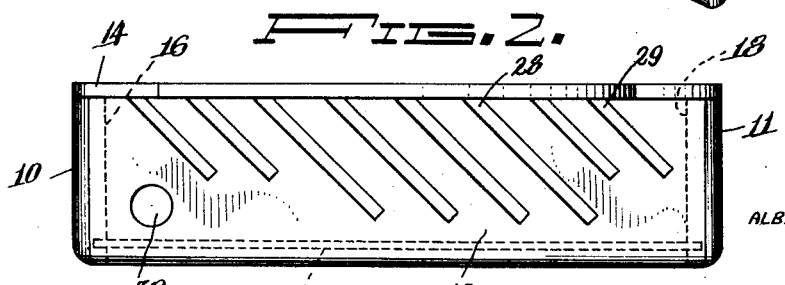
ALBERT E. ROSENBERG
INVENTOR.
BY
ATTORNEY.

Jan. 4, 1944.  A. E. ROSENBERG  2,338,303
KNIFE RACK
Filed June 22, 1943  2 Sheets-Sheet 2
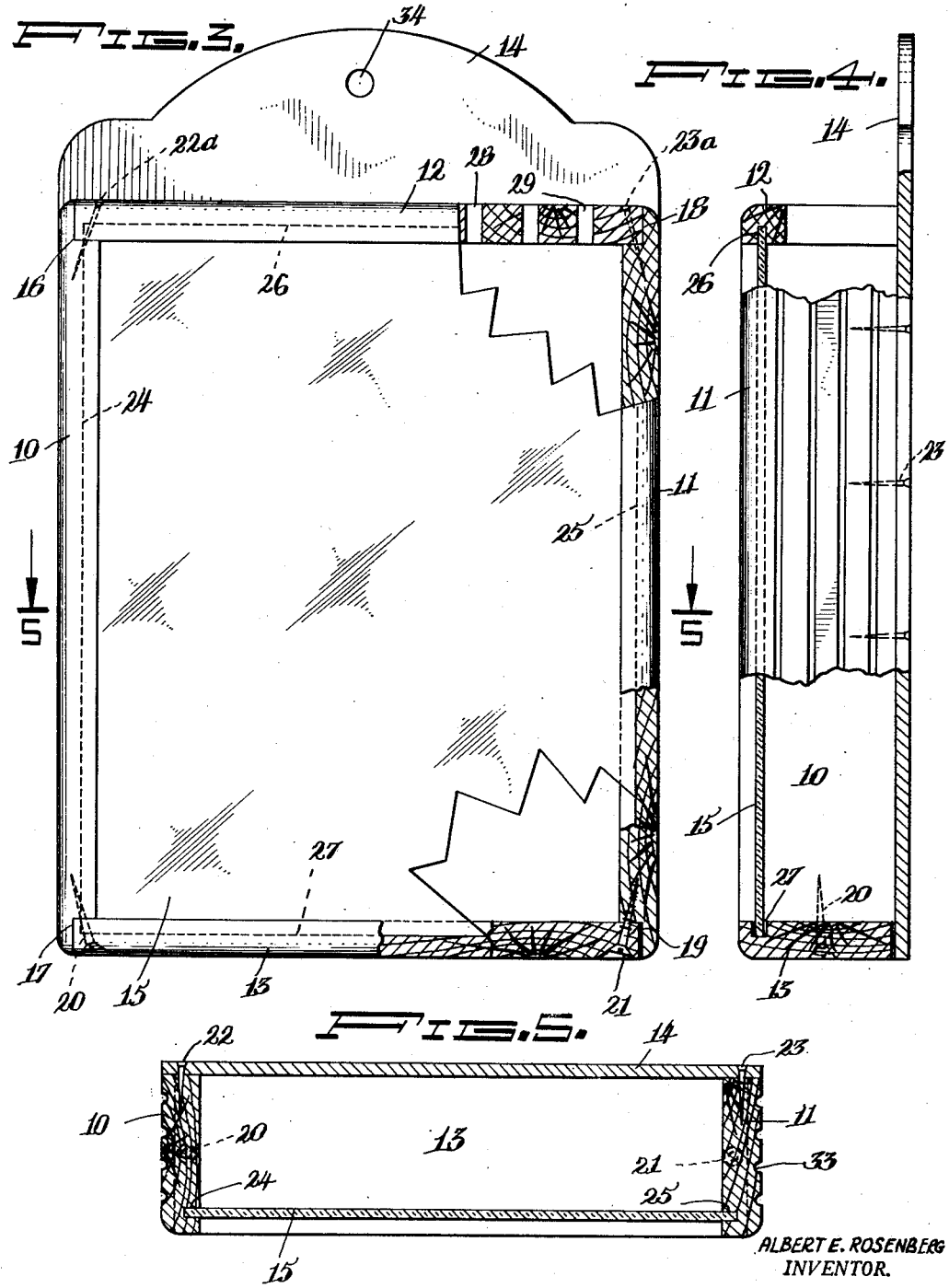
ALBERT E. ROSENBERG
INVENTOR.
BY
ATTORNEY.

Patented Jan. 4, 1944

2,338,303

UNITED STATES PATENT OFFICE 2,338,303

KNIFE RACK

Albert E. Rosenberg, New York, N. Y.

Application June 22, 1943, Serial No. 491,757

1 Claim. (Cl. 211—60)

This invention relates generally to kitchen articles, but more specifically to a rack for knives or the like.

The main object of the invention resides in the provision of a rack so constructed whereby a plurality of knives or the like may be readily disposed therein and easily removed therefrom.

A further object of the invention resides in the provision of a rack which protects the sharpened edges of knife blades, which will prevent possible injury to persons by a complete encasing of the blades and which permits blades to be in a suspended condition hanging freely from the handles thereof, said handles engaging one of the walls of the rack. By such a suspension, the sharpened edges of the knives remain in a sharpened condition.

A further feature of the invention resides in the provision of a removable portion of the rack whereby the inner walls thereof may be cleaned.

A further object of the invention is to provide a rack that may be supported on a wall, cupboard or the like that will display and support frequently used knives and that permits easy selection of the knife desired by virtue of the transparency of the front wall.

Other objects of the invention are to provide a rack that is highly attractive in appearance, durable in use and economical to manufacture.

These objects and other incidental ends and advantages of the invention will hereinafter appear in the progress of the disclosure and as pointed out in the appended claim.

Accompanying this specification are drawings showing a preferred form of the invention wherein corresponding reference characters designate corresponding parts throughout the several views and wherein:

Figure 1 is a view in perspective showing a knife rack in operative position with a knife handle mounted therein, the blade being shown in dotted lines.

Figure 2 is a top plan view of the rack.

Figure 3 is a front view in elevation of the rack with portions broken away.

Figure 4 is a side view in elevation of the rack with portions broken away.

Figure 5 is a transverse sectional view of Figure 3 along the plane 5—5 thereof.

In accordance with the invention and the preferred form shown the device provides an article that is both useful, that occupies a minimum of space, and that adds artistic effect to the wall on which it is supported.

Thus, the rack as shown comprises a framework having side walls 10 and 11, an upper supporting block 12 and a bottom wall 13. A back wall 14 serves as a closure for the rear of the framework, while the front thereof is provided with a light-pervious window 15 which may be made of glass or plastic material. All the parts described except window 15 may be of composition, plastic or other suitable material, but as indicated in the drawings are of wood because of cheapness in manufacture.

The side walls 10 and 11 are suitably secured to the supporting member 12 and the bottom member 13. As shown, the transverse edges of side walls 10 and 11 are provided at the inner ends with rabbets 16, 17 and 18, 19.

The supporting member 12 at the transverse edges thereof sits on rabbets 16 and 18 and is suitably secured thereto as by glue, cement, screws or nails 22a and 23a. Bottom wall 13 is similarly adapted to sit on rabbets 17 and 19 of side walls 10 and 11 and is removably secured thereto in any suitable manner such as by the use of screws 20 and 21.

The side walls 10 and 11 and the supporting member 12 of the framework are suitably affixed to the back wall 14 by any means such as glue, cement, tacks or nails 22 and 23.

Window 15 is suitably removably mounted within the framework, but as shown fits into a series of grooves provided on the inner surfaces of side walls 10 and 11, supporting member 12 and bottom wall 13. Thus, side walls 10 and 11 at the inner faces thereof are provided with grooves 24 and 25 respectively, while supporting member 12 on the inner face is provided with groove 26 and bottom wall 13 on the upper face is provided with groove 27. Thus, grooves 24, 25, 26 and 27 meet at the ends thereof to form a continuous groove in the same plane. In order to introduce window 15 into the groove mounting, it is necessary to remove bottom wall 13 by removing screws 20 and 21 whereupon window 15 is guided along grooves 24 and 25 until the upper transverse edge engages groove 26 of the upper supporting member 12. Thereafter bottom wall 13 is made to reengage rabbets 17 and 19 to permit the lower transverse edge of window 15 to engage groove 27. Thereupon screws 20 and 21 are applied for fastening purposes.

The upper supporting member 12 is provided with a series of spaced slots extending from the rear edge thereof and preferably terminating inwardly of the front edge. As shown, the slots are angularly disposed with respect to the longitudinal edges of supporting member 12 and are of different sizes as indicated by numerals 28 and 29. The variation in the length of the slots is to accommodate blades of knives having various widths while the widths of the slots themselves may be varied to accommodate the blades also varying in thickness. A knife sharpener may be supported on the supporting member 12 by the use of an opening 30 therein.

A knife having a handle 31 and a blade 32 is shown in Figure 1 in protected position.

It is to be observed that the outer walls of slots 28 and 29 are disposed inwardly of the peripheral grooves 24, 25, 26 and 27 of the framework so that the edge of the blades is never in contact with the window 15. Moreover, the open ends of slots 28 and 29 are closed by the elongated rear wall 14. In the manufacture of the rack the member 12 is slotted along the rear longitudinal edge before assemblage with the side walls 10 and 11 or before affixation of the framework to the rear wall 14.

From the construction of the rack described, it is seen how a knife is insertable within slots 28 or 29 without causing interference with the sharp edge of the blade 32 and without exposing the blade althougher to human touch. The slots 28 and 29 are made long enough to permit the blade to penetrate therethrough intermediate the length thereof. Whenever the enclosure is soiled for the usual reasons it is necessary to remove bottom wall 13 with window 15 in order to gain access to the interior for cleaning purposes.

The device may be made of any desired shape and possess ornamentation. As shown, the outer faces of side walls 10 and 11 are provided with spaced longitudinal grooves 33 while the upper protruding portion of back wall 14 is provided with an opening 34 for supporting purposes on a wall and with an upper scalloped edge.

It is to be observed that the light pervious window 15 serves to expose to view the blades within the rack and at the same time performs the function of a guard to prevent accidental contact and as a closure to prevent entry of dust. However, when desirable a screen may be used instead of a solid window. In this event, the screen can be permanently affixed to the framework.

I wish it understood that minor changes and variations in the shape, material, location and integration of parts of the invention may all be resorted to without departing from the spirit of the invention and the scope of the appended claim.

I claim:

As an article of manufacture, a rack for knives or the like comprising an upper supporting member for said knives or the like having spaced slots extending from the rear edge thereof for penetration of knife blades or the like, side walls for said supporting member, a removable bottom wall forming a framework with the upper supporting member and the side walls, an elongated back member forming a closure for the rear ends of said slots and a rear closure for the framework, a light pervious window for the framework removably mounted therein and disposed within the forward portion thereof and beyond the front walls of said slots.

ALBERT E. ROSENBERG.